Figure 1:
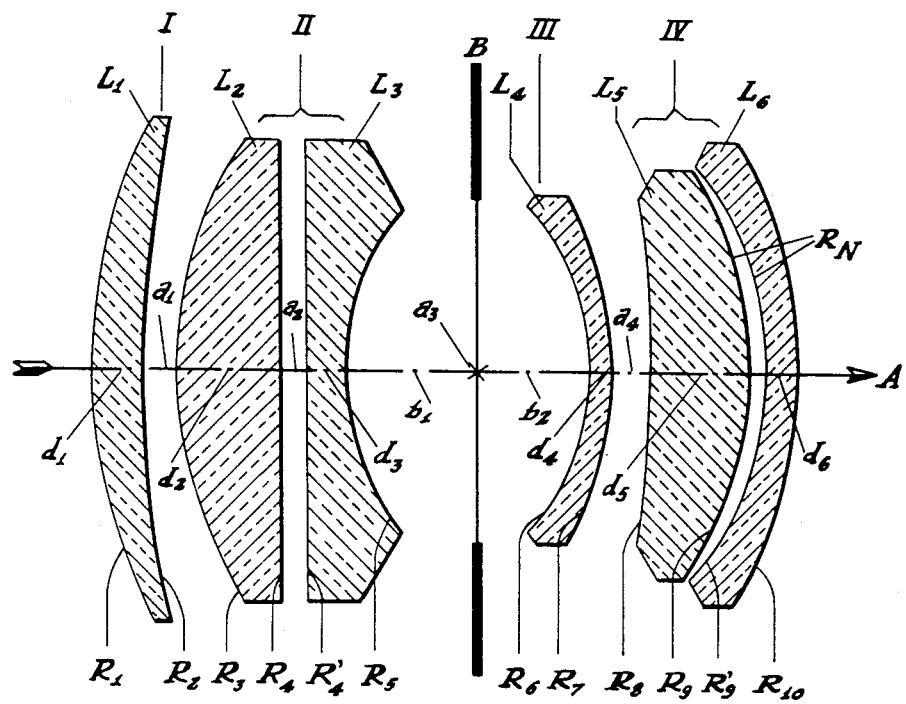

Feb. 7, 1956

A. W. TRONNIER 2,733,636

FOUR COMPONENT OPTICAL OBJECTIVE SYSTEM
OF THE MODIFIED GAUSS TYPE
Filed May 19, 1952

INVENTOR.
ALBRECHT WILHELM TRONNIER
BY
Mock & Blum
ATTORNEYS.

United States Patent Office 2,733,636
Patented Feb. 7, 1956

2,733,636

FOUR COMPONENT OPTICAL OBJECTIVE SYSTEM OF THE MODIFIED GAUSS TYPE

Albrecht Wilhelm Tronnier, Gottingen, Germany, assignor to Voigtländer, A. G., Braunschweig, Germany, a corporation of Germany Application May 19, 1952, Serial No. 288,688

Claims priority, application Germany February 4, 1952

6 Claims. (Cl. 88—57)

This invention relates to a new and improved objective of great light-transmitting capacity and anastigmatic imageflatness, of the modified Gauss-type. More particularly, the invention relates to a new and improved objective of said type, in which the diaphragm (B) is enclosed by two lenses in such manner that in the front half (I, II) of the objective, on the side of the longer conjugate, as well as in the rear half (III, IV) of the objective, on the side of the shorter conjugate, a simple, uncemented meniscus-shaped individual lens (I and III), which is concave toward the diaphragm, is followed, in the direction of light from the object space to the image space, by a composite lens group (II and IV) of opposite power. In the objectives embodying the present invention, said meniscus-shaped individual lenses (I and III), of the front half and rear half, respectively, of the objective, are of opposite power and said composite lens groups (II and IV) consisting of lenses of opposite power, of the front half and rear half, respectively, of the objective, are likewise of opposite power. Furthermore, said composite lens group IV of the rear half of the objective includes a collecting pair of strongly curved adjacent surfaces $R_N$ which is concave toward the diaphragm and may consist of a collecting cemented surface.

The main object of the present invention is to provide objectives of the above mentioned tyue, in which the hereinafter described specific combinations of design and structural and/or optical characteristics of the lenses forming part of the objective, are embodied in order to obtain improved photographic performance of the objective.

A further object of the invention consists in essentially reducing the zonal aberrations in the axial as well as in the non-axial parts of the image field of anastigmatic flatness.

Other objects and the advantages of this invention will be apparent from the appended drawings and claims and the following specification which describes, by way of example, some embodiments of my invention.

It has been found that by a correction of residual aberrations with particularly small zonal aberrations, the objectives embodying the present invention attain those characteristics which, even in the case of systems of high light-transmitting capacity, render it possible to define with a predetermined focal length, a field of vision in such manner that the diameter of the field within which the definition is of normal, satisfactory condition for reproductions, substantially corresponds to said focal length.

In objectives of the modified Gauss-type, embodying the present invention, the rear half of the objective on the side of the shorter conjugate, comprises two meniscus-shaped diverging lenses, which are concave toward the diaphragm, and said lenses enclose a collecting lens of unequal curvature, the most strongly curved surface of which is likewise concave toward the diaphragm. The pair of adjacent surfaces formed by the rear surface of said collecting lens and the front surface of the diverging last meniscus-shaped lens, has a strongly collecting equivalent refractive power, so that if the two lenses are cemented, the cemented surface has a collecting effect.

I have now found that the photographic performance of objectives of the above described type, can be substantially improved by meeting the following requirements: (a) the two diverging meniscus-shaped lens elements ($L_4$ and $L_6$) of the rear half of the objective, which are concave toward the diaphragm (B) and enclose a collecting lens ($L_5$) of unequal curvature, should consist of glasses of such refractive characteristics that the arithmetical mean of the refractive indices of $L_4$ and $L_6$, based on yellow light of the $d$-line of the helium spectrum, is higher than 1.5750; (b) the curvature of said collecting lens ($L_5$) should be selected in such manner that the refractive power ($\varphi_9$) of its rear surface ($R_9$), which is concave toward the diaphragm, referred to yellow light and to the surrounding air, amounts to 1.5 to 4.5 times the total equivalent refractive power of the complete objective, for the same color.

This refractive power referred to the adjacent air, measured in diopters, can be calculated from the known formula $$\varphi_j = \frac{1000 \cdot (n-1)}{/R_j/}$$

in which index $j$ denotes the order number of the surface, the radius $R_j$ of curvature of which is measured in mm.

The improvement obtained according to the present invention can be still further increased by applying the new selection of glasses to all elements of the rear half of the objective. In this case, the glasses of lens elements $L_4$, $L_5$, $L_6$ should be selected in such manner that the arithmetical mean of the refractive indices of these three lenses is higher than 1.610, referred to the yellow light of the $d$-line of the helium spectrum.

In the enclosed drawings, Figure 1 is a vertical axial section of my new objective, taken along its optical axis. The horizontal optical axis is indicated by horizontal arrow A, which also indicates the direction of the light, from left to right. The object space is at the left of the objective, and the image space is at the right of the objective.

Figure 2:
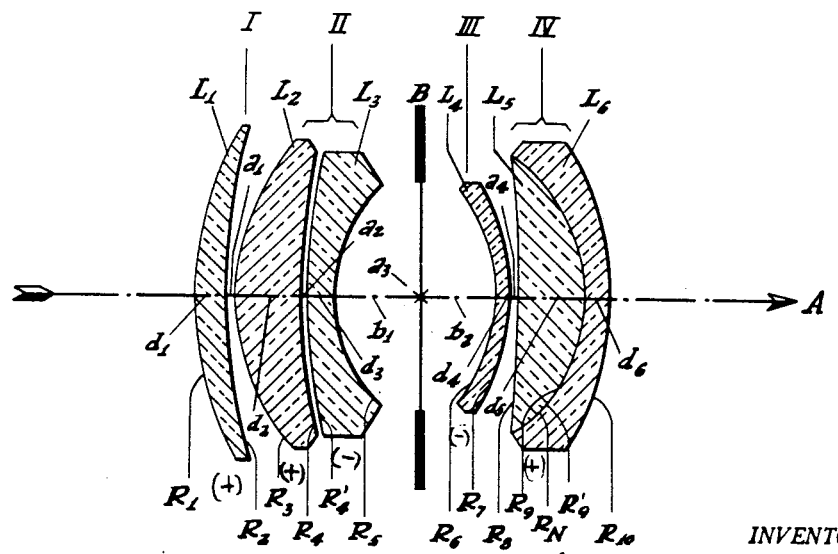

Figure 2 illustrates an embodiment of the invention for an equivalent focal length of $f=150$ mm., in natural size, the structure of which is proportional to the following numerical example.

In the following disclosure and drawings, certain symbols are used, which are identified as follows:

B is the diaphragm of the objective.

The lenses or lens groups forming the objective, are denoted I, II, III and IV. I is a meniscus-shaped individual lens and II a lens group arranged on the side of the major conjugate. III is a meniscus-shaped lens and IV a lens group, III and IV being located on the side of the minor conjugate.

The individual lens elements are denoted $L_1$, $L_2$, $L_3$, $L_4$, $L_5$ and $L_6$ from left to right.

The radii of curvature of the lens surfaces are denoted by reference symbols $R_1$, $R_2$, $R_3$, $R_4$, $R'_4$, $R_5$, $R_6$, $R_7$, $R_8$, $R_9$, $R'_9$, $R_{10}$; the axial thickness of the lenses by $d_1$, $d_2 \ldots d_6$; the axial thickness of the air spaces $a_1$, $a_2$, $a_3$, $a_4$; the radii of adjacent surfaces of the individual lenses in lens groups II and IV, are denoted $R_4$, $R'_4$ and $R_9$, $R'_9$, respectively.

$n_1$, $n_2$, $n_3$, $n_4$, $n_5$ and $n_6$ denote the mean indices of refraction for the yellow spectral line of helium light ($n_d$), of the individual lens elements of the objective, from left to right in the drawings, while the color dispersion of these lens elements is characterized by the numerical value of their Abbe number $\nu$.

$b_1$ and $b_2$ denote the axial distance of the diaphragm from the composite lens group (II) arranged on the side of the major conjugate and from the individual meniscus-shaped lens (III) arranged on the side of the minor conjugate, respectively. $R_N$ denotes a cemented surface formed by adjacent surfaces of the lenses of group (IV).

The data of the numerical example, are based on a focal length of $f=100$, and, therefore, the lengths of radii, the axial thickness of the lenses and the axial thickness of the air spaces, are stated in mm. As an indication of the great number of possibilities of specific variations within the scope of the present invention, the inner radii $R_4$, $R'_4$ of lenses $L_2$, $L_3$ are shown to be equal and separated by a small air gap only, in order to indicate that these two lenses can be cemented together to form one lens member.

Numerical example
[$f=100$ mm.  Relative aperture 1:2.2]

| | | | |
|---|---|---|---|
| $R_1 = + 43.446$ | $d_1 = 4.31$ | $n_1 = 1.6676$ | $\nu_1 = 41.9$ |
| $R_2 = +103.469$ | $a_1 = 0.19$ | air | |
| $R_3 = + 30.000$ | $d_2 = 9.11$ | $n_2 = 1.7015$ | $\nu_2 = 41.1$ |
| $R_4 = +113.169$ | $a_2 = 0.04$ | air | |
| $R'_4 = +113.169$ | $d_3 = 3.45$ | $n_3 = 1.7552$ | $\nu_3 = 27.5$ |
| $R_5 = + 19.185$ | $a_3 = 21.125$ | air | diaphragm space |
| $R_6 = - 21.448$ | $d_4 = 2.16$ | $n_4 = 1.6034$ | $\nu_4 = 38.0$ |
| $R_7 = - 28.951$ | $a_4 = 0.04$ | air | |
| $R_8 = -127.341$ | $d_5 = 9.16$ | $n_5 = 1.6935$ | $\nu_5 = 53.5$ |
| $R_N \begin{cases} R_9 = - 21.276 \\ R'_9 = - 21.276 \end{cases}$ | cemented | | |
| $R_{10} = - 37.124$ | $d_6 = 3.02$ | $n_6 = 1.5836$ | $\nu_6 = 42.0$ |

The paraxial intersectional width of the objective amounts to $s'_0 = 70.08$ mm. for yellow light.

According to the above table, $n_4 = 1.6034$ and $n_6 = 1.5836$. The arithmetical means of the refractive indices amounts thus to 1.5935, i. e. it is distinctly higher than 1.5750.

The surface refractive power of the radius of curvature $R_9$ amounts in this case to $693.5 : 21.276 = 32.595$, which is 3.260 times the equivalent refractive power of the total objective, and is thus in the range of 1.5 to 4.5 times of this value.

The sum of the refractive figures of the entire rear member of the objective is $$1.6034 + 1.6935 + 1.5836 = 4.8805$$

and this corresponds to an arithmetical mean of $$4.8805 : 3 = 1.62683$$

which is distinctly higher than 1.610.

A preferred embodiment of my invention has been described, but numerous changes, omissions, additions and substitutions can be made without departing from its scope.

The sequence of refractive power values according to the present invention shows a distribution of the surface refractive powers within the objective system in such manner that the sum of the surface refractive forces, expressed in percent of the equivalent refractive power of the total objective, is in the following ranges for the individual members of the objective:

Member I, between $+60\%$ and $+120\%$
Member II, between $-100\%$ and $-200\%$
Member III, between $-40\%$ and $-100\%$
Member IV, between $+100\%$ and $+200\%$ of the equivalent total refractive power of the entire system, which in the above example, has a focal length of $f = 100$ mm. and an equivalent total refractive power of $+10.0$ dptr.

In addition to the above sequence of refractive power values, the constructive design of the system according to the present invention can be also characterized by the radii of curvature of the lens surface and it is characterized in its structural design by the following values:

$$I \begin{cases} 30\% \, f < +R_1 < 60\% \, f \\ 60\% \, f < +R_2 < 180\% \, f \end{cases} L_1$$

$$II \begin{cases} 20\% \, f < +R_3 < 40\% \, f \\ 40\% \, f < +R_4 < 240\% \, f \\ 40\% \, f < +R'_4 < 240\% \, f \\ 12\% \, f < +R_5 < 30\% \, f \end{cases} \begin{matrix} L_2 \\ \\ L_3 \end{matrix}$$

$$III \begin{cases} 14\% \, f < -R_6 < 34\% \, f \\ 18\% \, f < -R_7 < 42\% \, f \end{cases} L_4$$

$$IV \begin{cases} 50\% \, f < \pm R_8 < \infty \\ 14\% \, f < -R_8 < 34\% \, f \\ 14\% \, f < -R'_9 < 34\% \, f \\ 25\% \, f < -R_{10} < 55\% \, f \end{cases} \begin{matrix} L_5 \\ \\ L_6 \end{matrix}$$

In member III, $R_6$ is numerically smaller than $R_7$.

What is claimed is:

1. An optical objective system of the modified Gauss-type, of high light-transmitting capacity and anastigmatic image flatness, comprising a diaphragm enclosed by two groups of lenses in such manner that in the front half of the objective on the side of the major conjugate, as well as in the rear half of the objective on the side of the minor conjugate, a simple, uncemented meniscus-shaped individual lens is followed, in the direction of light from object to image, by a composite lens group of opposite power; the rear half of the optical system, following the diaphragm in the direction of light, comprising an inner and an outer meniscus-shaped diverging lens which are concave toward the diaphragm and enclose a collecting lens of unequal curvature, said collecting lens and the meniscus-shaped diverging lens following it in the direction of light, having a pair of adjacent surfaces, which is likewise concave toward the diaphragm and is of collecting equivalent refractive power; said meniscus-shaped diverging lenses of the rear half of the objective, which are concave toward the diaphragm and enclose said collecting lens of unequal curvature, having refractive indices, the arithmetical mean of which is higher than 1.5750, based on yellow light of the $d$-line of the helium spectrum; the outer surface of said collecting lens of unequal curvature, forming part of said pair of adjacent surfaces and having a surface refracting power, when exposed to the surrounding air and for an index of refraction corresponding to yellow light of the $d$-line of helium, in the range of 1.5 to 4.5 times the equivalent refractive power of the total objective the arithmetical mean of the refractive index values of the three lens elements forming the rear half of the objective being higher than 1.610, based on the yellow light of the helium spectrum.

2. An optical objective system as claimed in claim 1, in which said pair of adjacent surfaces in the rear half of the objective forms a strongly curved, collecting cemented surface.

3. An optical objective system as claimed in claim 1, in which said pair of adjacent surfaces in the rear half of the objective forms a strongly curved, collecting cemented surface, and the arithmetical mean of the refractive index values of the three lens elements forming the rear half of the objective, is higher than 1.610, based on the yellow light of the helium spectrum.

4. An optical objective system of the modified Gauss-type, of high light-transmitting capacity, according to claim 1, in which the surface refractive powers are distributed within the objective system in such manner that the sum of the surface refractive powers of the individual members of the objective, expressed in percent of the equivalent refractive power of the total objective, is in the following ranges:

Member I, between +60% and +120%
Member II, between −100% and −200%
Member III, between −40% and −100%
Member IV, between +100% and +200% of the equivalent total refractive power of the entire objective system.

5. An optical objective system of the modified Gauss-type, of high light-transmitting capacity, according to claim 1, in which the radii of curvature of the lens surfaces have the following values:

$$I \begin{cases} 30\%f < +R_1 < 60\%f \\ 60\%f < +R_2 < 180\%f \end{cases} L_1$$

$$II \begin{cases} 20\%f < +R_3 < 40\%f \\ 40\%f < +R_4 < 240\%f \end{cases} L_2 \\ \begin{cases} 40\%f < +R'_4 < 240\%f \\ 12\%f < +R_5 < 30\%f \end{cases} L_3$$

$$III \begin{cases} 14\%f < -R_6 < 34\%f \\ 18\%f < -R_7 < 42\%f \end{cases} L_4$$

$$IV \begin{cases} 50\%f < \pm R_8 < \infty \\ 14\%f < -R_9 < 34\%f \end{cases} L_5 \\ \begin{cases} 14\%f < -R'_9 < 34\%f \\ 25\%f < -R_{10} < 55\%f \end{cases} L_6$$

$R_6$ in member II being numerically smaller than $R_7$, wherein ($R_1$ to $R_{10}$) = the radii of the refracting surface curvatures; f = the focal length of the total objective; $L_1$ to $L_6$ = the lens elements of the objective, $n_1$ to $n_6$ = the refractive index of the lens materials of the lenses $L_1$ to $L_6$; $\nu_1$ to $\nu_6$ = Abbe number of the lens materials of the lenses $L_1$ to $L_6$.

6. An optical objective system of the modified Gauss-type, of high light-transmitting capacity according to claim 1, in which the structural design of the lens members forming the objective meets the following conditions:

| In the front part of the objective: | | | |
|---|---|---|---|
| I $\begin{cases} R_1 = +0.4 \times f \\ R_2 = +1.0 \times f \end{cases}$ | $n_1 = 1.66$ | $\nu_1 = 42$ | $L_1$ |
| II $\begin{cases} R_3 = +0.3 \times f \\ R_4 = +1.1 \times f \\ R'_4 = +1.1 \times f \\ R_5 = +0.2 \times f \end{cases}$ | $n_2 = 1.66$ $n_3 = 1.75$ | $\nu_2 = 42$ $\nu_3 = 28$ | $L_2$ $L_3$ |
| In the rear part of the objective: | | | |
| III $\begin{cases} R_6 = -0.2 \times f \\ R_7 = -0.3 \times f \end{cases}$ | $n_4 = 1.60$ | $\nu_4 = 38$ | $L_4$ |
| IV $\begin{cases} R_8 = -1.3 \times f \\ R_9 = -0.2 \times f \\ R'_9 = -0.2 \times f \\ R_{10} = -0.4 \times f \end{cases}$ | $n_5 = 1.69$ $n_6 = 1.58$ | $\nu_5 = 54$ $\nu_6 = 42$ | $L_5$ $L_6$ | wherein ($R_1$ to $R_{10}$) = the radii of the refracting surface curvatures; f = the focal length of the total objective; $L_1$ to $L_6$ = the lens elements of the objective; $n_1$ to $n_6$ = the refractive index of the lens materials of the lenses $L_1$ to $L_6$; $\nu_1$ to $\nu_6$ = abbe number of the lens materials of the lenses $L_1$ to $L_6$.

References Cited in the file of this patent

UNITED STATES PATENTS

| 2,164,028 | Berek | June 27, 1939 |
| 2,171,641 | Berek | Sept. 5, 1939 |

FOREIGN PATENTS

| 428,657 | Germany | May 10, 1926 |
| 427,008 | Great Britain | Apr. 12, 1935 |
| 665,520 | Germany | Sept. 27, 1938 |